July 29, 1969  F. R. WINSEN  3,458,236
TRACTION INCREASING DEVICE
Filed July 19, 1967  4 Sheets-Sheet 1

FELIX R. WINSEN
INVENTOR.

BY H. M. Saragovitz
E. J. Kelly, H. Berl
and R. M. Lyon
ATTORNEYS

July 29, 1969    F. R. WINSEN    3,458,236
TRACTION INCREASING DEVICE
Filed July 19, 1967    4 Sheets-Sheet 2

FELIX R. WINSEN
INVENTOR.
H. M. Saragovitz
BY E. J. Kelly, H. Berl
and R. M. Lyon
ATTORNEYS July 29, 1969          F. R. WINSEN          3,458,236
TRACTION INCREASING DEVICE
Filed July 19, 1967                    4 Sheets-Sheet 3
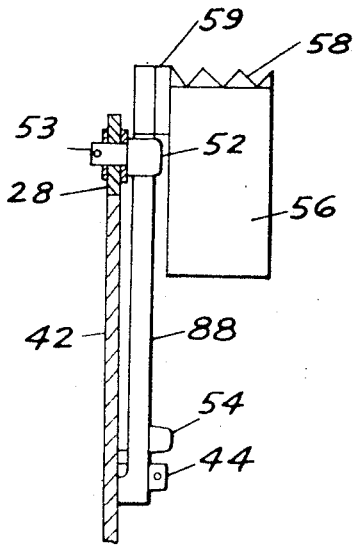
FIG. 4
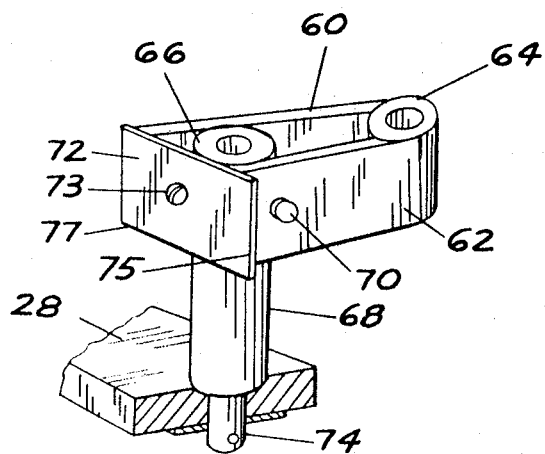
FIG. 5
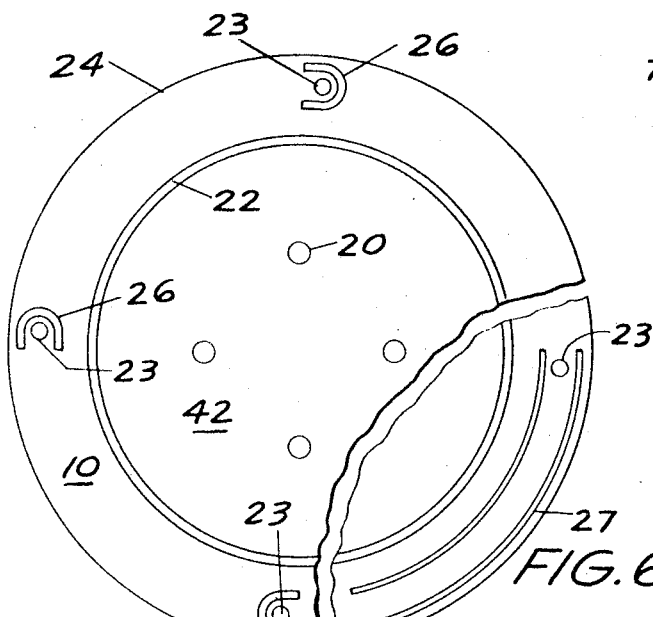
FIG. 6
FIG. 6A
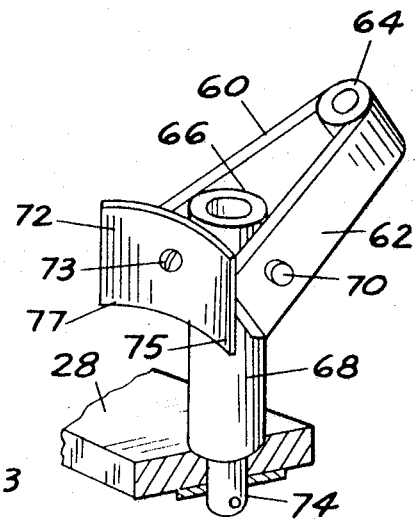
FIG. 7
FELIX R. WINSEN
INVENTOR.
BY H. M. Saragovitz
E. J. Kelly, H. Berl
and R. M. Lyon
ATTORNEYS July 29, 1969  F. R. WINSEN  3,458,236
TRACTION INCREASING DEVICE
Filed July 19, 1967  4 Sheets-Sheet 4
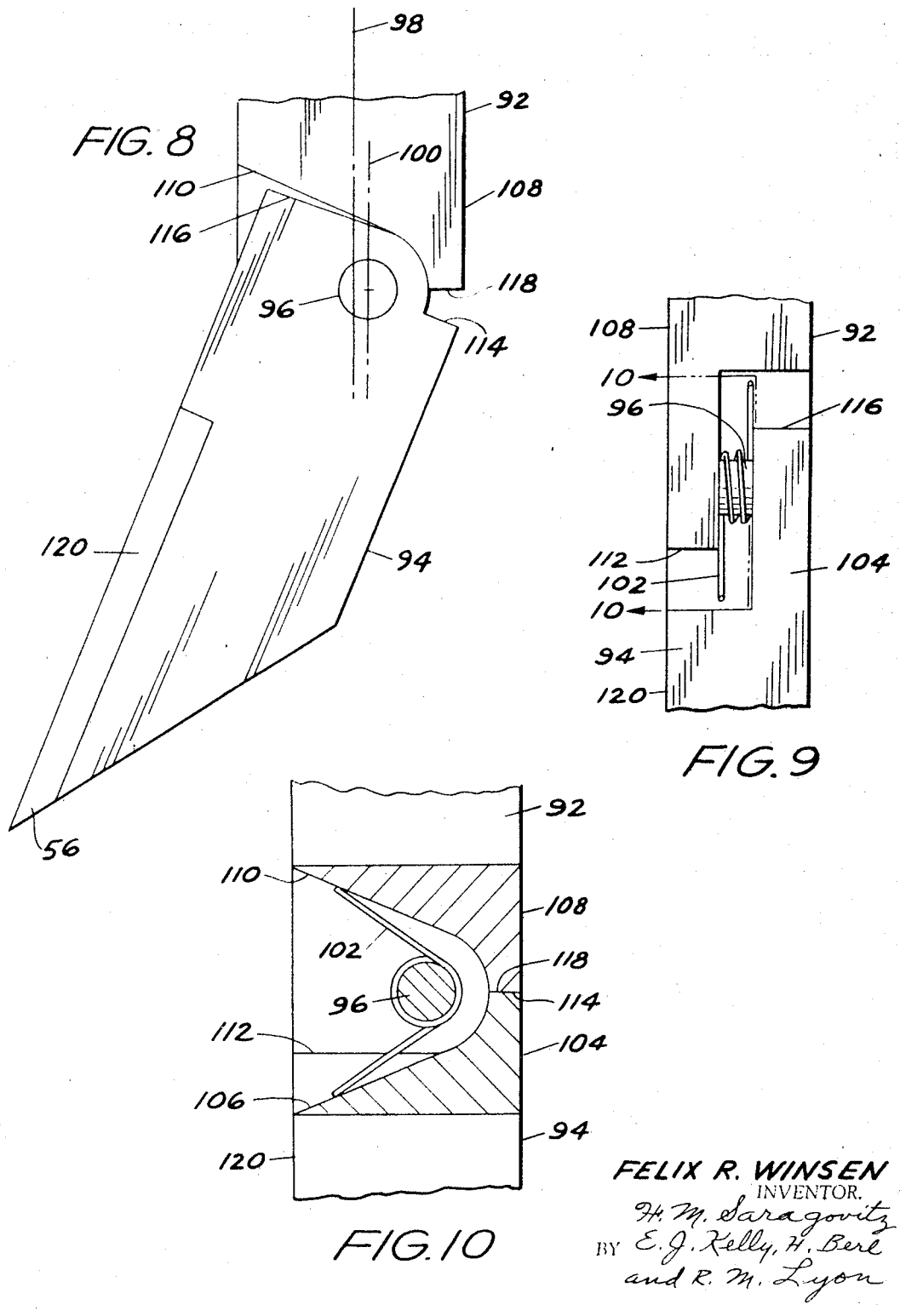

United States Patent Office 3,458,236
Patented July 29, 1969

3,458,236
TRACTION INCREASING DEVICE
Felix R. Winsen, 4412 Webster Road,
Royal Oak, Mich. 48072
Filed July 19, 1967, Ser. No. 654,660
Int. Cl. B60b 39/00, 15/00
U.S. Cl. 301—47                 21 Claims

ABSTRACT OF THE DISCLOSURE

This device is a traction improving assembly, attachable to land vehicle wheels or driving sprockets, having spikes and/or attaching devices which are radially extendable beyond the perimeter of the tire, tract, or other surface-contacting point of the vehicle. Locks are provided for securing the spikes in any predetermined position within the range of full retraction to full extension in which latter position the spikes will engage the contacting surface.

---

The invention described herein may be manufactured and used by or for the Government of the United States of America for governmental purposes without the payment of royalties thereon or therefor.

This invention relates to a device for greatly improving the traction capability of a vehicle. More particularly, the present invention relates to detachable means having controlled extension means for engaging the traversed surface for providing periodically improved traction for the vehicle.

Apparatus has been previously designed for providing increased traction to wheels and/or track, however, they have all proved to be unsatisfactory. In general, these prior systems utilized cleats, spikes, grousers, paddles, chains, or large deep tire tread, all of which were fixed and stationary on the wheel. Some of these systems are permanently attached; some are integral parts of the wheel; others are temporary fixtures which need to be completely removed before reaching hard ground. Other disadvantages of such prior systems include inadequate traction, interference with hard surface travel; and difficulty of installation or removal.

According to the present invention, there is provided a traction device which is mounted on the wheel of a land vehicle for selectively improving the vehicle traction by means of radially extendable spikes. The spikes can be held in any position from full retraction to full extension by means of locking devices. These spikes engage the traversed surface and enable the vehicle to traverse otherwise impassable terrain.

In general, therefore it is the object of the present invnetion to eliminate all of the above mentioned disadvantages.

It is a further object of the present invention to provide a device which is easily installed and removed for increasing the traction of a vehicle.

It is a further object of the invention to provide for a traction device of the type mentioned which is normally retracted when not in use and can be readily extended to engage the traversed surface.

It is still another object of the invention to provide a device of the type described which can be locked in any predetermined position by means of a new and improved locking system.

A further object of the present invention is to provide a device of the type described which is adaptable to variable terrain conditions.

A still further object of the present invention is to provide a traction device of the type described which provides the flexibility of variable spike extension and which is immediately available to optimum positions to confront changing terrain conditions.

Other objects and advantages of the present invention will be made obvious to those skilled in the art by the following description when considered in relation to the accompanying drawings in which:

FIG. 4 is a fragmentary elevational view, parts broken away in section, to illustrate the attachment of the spike.

FIG. 5 is a perspective view of the locking device in the lock position.

FIGS. 6 and 6A are side elevational views of the attaching plate with two alternate designs for the spacers.

FIG. 7 is a perspective view of the locking device in the raised position.

FIG. 8 is a side elevational view of another embodiment of the spike.

FIG. 9 is a front elevational view of the spike assembly shown in FIG. 8.

FIG. 10 is a cross-sectional view of the spike assembly taken along lines 10—10 of FIG. 9.

Figure 1:
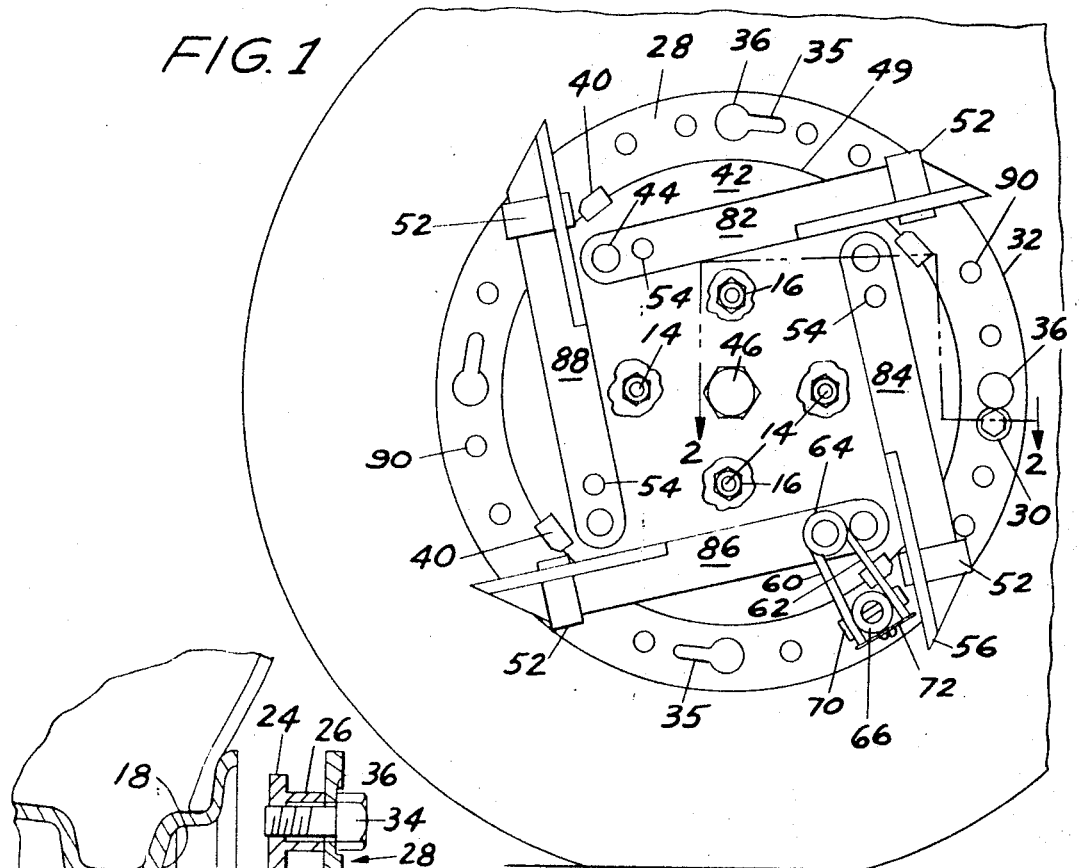
FIG. 1 is a side elevation view, parts broken away, of the device according to the present invention with the spike in the retracted position.

Referring now to the drawing, the same numerals will be used to refer to similar parts in the various figures. As can best be seen in FIGS. 1 and 2, wheel drum 12 has wheel 18 and accompanying tire (shown in phantom) mounted thereon in a conventional manner by wheel studs 14 and wheel attaching nuts 13. Although the drawings represent application of the device to a wheel, the traction device could easily be attached to a driving sprocket or other component without alteration of the basic concept. Therefore, for purposes of coordinating the description of the device, its installation and operation with the accompanying drawing, reference will be made to installation of the device on a wheel only, with the understanding that the same description would apply in essence to application on a driving sprocket or other component.

Studs 14 are extra long and are adapted to fit through apertures 20 in attaching plate 10. In addition, the studs must be of extra strength material or size to withstand the added forces of the spikes. Attaching plate 10 as shown in FIG. 6, the outer circumference of which is shown at 24, comprises a circular plate with apertures 20 at its central portion through which the extra long wheel studs extend, spacer ring flange 22 on which a rotatable disk, hereinafter described, will rest, and spacer flange 26 on which an outer ring, hereinafter described, will rest. As shown, the attaching plate 10 is secured to the wheel 18 and wheel drum 12 via means of attaching nuts 16 and extra long studs 14. To prevent studs 14 from bending under the rotational forces of the traction device, additional lugs and/or serrations may be provided in attaching plate 10 to meet corresponding serrations or lugs which may be formed in the wheel 18. Apertures 23 shown in FIG. 6, are located within spacers 26 at the outer circumference of attaching plate 10 for the purpose of receiving attaching bolts 34. As shown in FIG. 6A, an alternate design which can be used for the spacer member consists of ring segments 27 extending about the outer circumference of attaching ring 10.

Outer ring 28 is provided with a plurality of apertures 36 which are large enough for the heads of bolts 34 to pass without obstruction. Contiguous with apertures 36 are slots 35 in which shallow bore 30 is machined so that in the tightened position, the bolt head is recessed below the surface of the ring. This arrangement provides a positive lock against rotation in either direction of the ring relative to the attaching plate.

Rotatable disk 42 comprises a circular disk which rests on spacer ring 22 and within the internal circumference 49 of outer ring 28, a rotatable disk positioning nut 46, and spike anchoring pins 44. A portion of the disk is broken away in FIG. 1 to show the location of the studs 14 and nuts 16 which hold the attaching plate 10 to wheel drum 12. Positioning nut 46 is located on the centerline 47 of the wheel and disk and is used to rotate disk 42 for purposes which will be hereinafter described.

Figure 2:
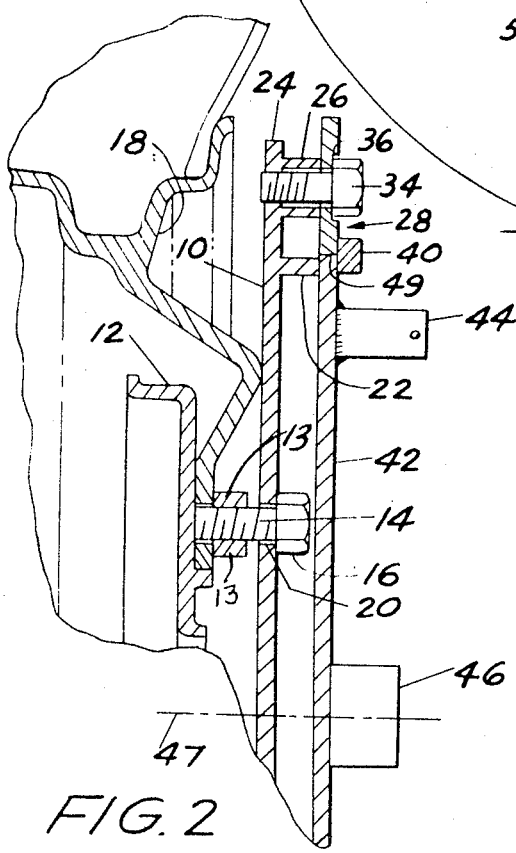
FIG. 2 is a partial section view taken along lines 2—2 of FIG. 1.

Pins 44 are utilized to rotatably position propelling or extension devices 82, 84, 86, and 88 (hereinafter called spikes), on the disk 42. As shown in FIGS. 1 and 2, position stops 40 are attached to the inner circumference of outer ring 28 in any suitable manner such as by welding. The dimensions of the parts are such that the disk 42 is held in place between the position stops 40 and spacer ring 22 of the attaching plate and is free to rotate easily and without binding as shown in FIG. 2. The disk 42 and outer ring 28 are further held together loosely by the installation of spikes and reaction collars, hereinafter explained.

Figures 3, 3A:
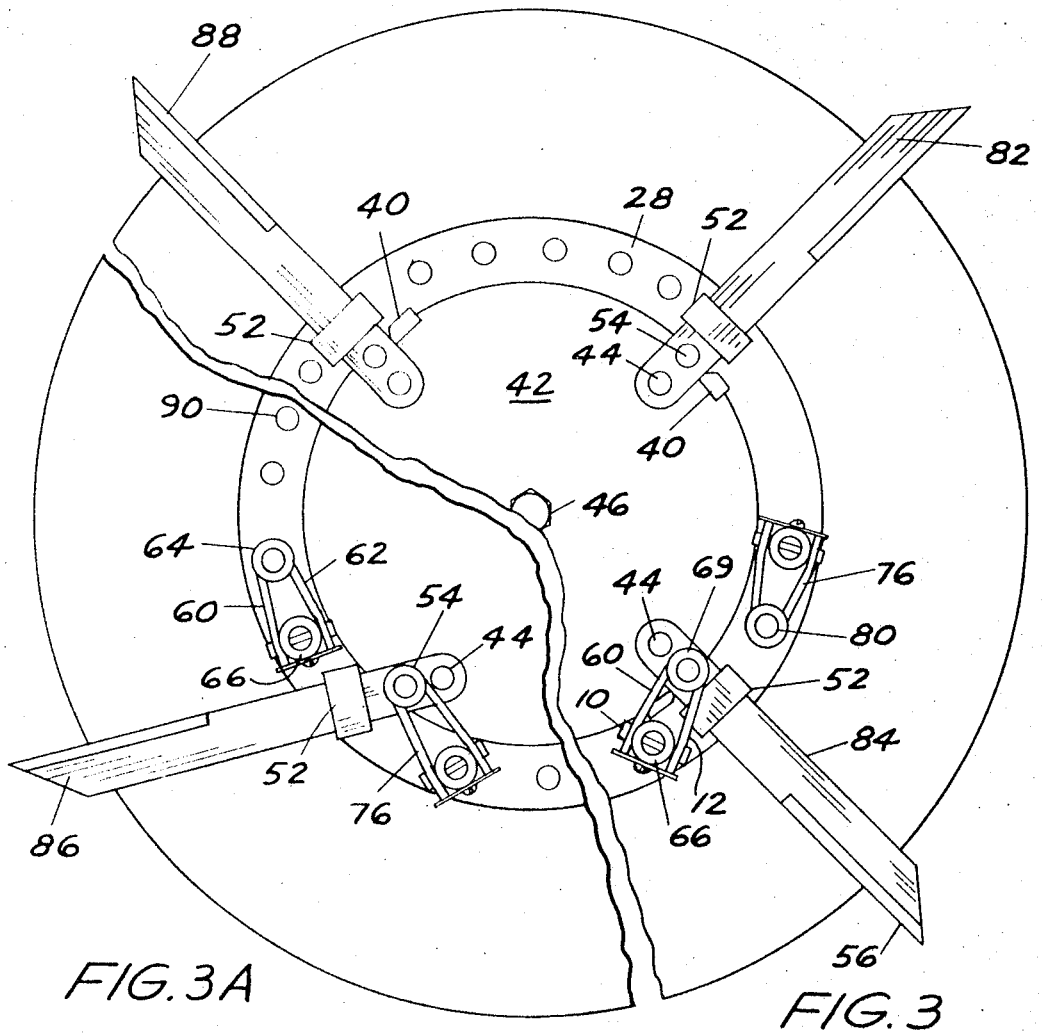
FIGS. 3 and 3A are side elevation views of the device according to the present invention with the spikes shown in the fully extended and partially extended positions.

The spikes 82, 84, 86 and 88 are shown in FIGS. 1, 3 and 4 as rotatable about pins 44. Toothed spades 56 having teeth 58 are attached to the outermost ends of the spikes in any suitable manner such as welding, bolting, or clipping. Retraction stops 59 are placed intermediate the spike and spade 56. In the event the spade is not attached, the retraction stop 59 prevents complete withdrawal of the spikes from the reaction collars. Pins 54 extend transversely to the spikes for engaging the locking device which will hereinafter be described. Pins 54 are preferably spaced from pins 44 so as to provide suitable moment forces for holding spikes 50.

Reaction collars 52 are also disposed about the outer ring 28. Reaction collar 52 is fixed to pin 53 which is journaled in outer ring 28 and held by any suitable mechanical means such as a cotter key. As spikes 82, 84, 86, and 88 are caused to turn, collar 52 will be free to pivot on pin 53 and guide the movement of the spikes.

The spikes may be of a size and shape best suited to provide traction in the kind of terrain expected to be encountered by the user. The length and shape of the spike, its distance of extension, and the location, length, width and shape of the spade 56 will depend upon the nature of the terrain traversed and consequent user requirements. It is to be understood that a paddle or some other accessory attachment could be substituted for the spade 56 if desired. It is not necessary that spade 56 be installed on the spike in which case the retraction stop 59 would be retained to limit the travel of the spike in the retracted position. The versatility of the device may be increased by the use of changeable spikes of various designs, sizes and shapes. Spikes of optimum size and shape may be installed to provide the greatest traction for the type of terrain anticipated.

The locking device, as best seen in FIGS. 5 and 7, is comprised of a collar 64 in which pin 54 is journaled, a collar 66 in which rotatable post 68 is fastened securely such as by shrink-fitting, longitudinally extending arm connecting members 60 and 62 connecting the collars 64 and 66, and a flat spring 72. The longitudinally extending arms 60 and 62 and collar 64 can be rotated about transverse pin 70. Flat spring 72 is secured to collar 66 at its center by screw means 73. In the locked position as shown in FIG. 5, the spring 72 will remain flat. When the lock is raised, however, the spring 72 will be curved as the result of arms 60 and 62 pressing on the outer edges 75 and 77 as shown in FIG. 6. If the lock is raised above an angle of about 45° toward the vertical position, the spring will force the lock up and hold it in the vertical position. Conversely, if the lock is lowered below an angle of approximately 45° from the horizontal, the flat spring 72 forces the lock into the locked position and holds it there securely. A portion 74 of the post 68 is of reduced diameter and is journaled in the outer ring so that the locking device is rotatable 360° on the rotatable post. The reduced diameter portion 74 of post 68 may be secured to ring 28 by any suitable mechanical means such as a cotter key.

FIG. 3 depicts the spikes in the fully extended position. This position will enable the spikes to contact and penetrate the soft and slippery terrain or water. Only three of spikes 82, 84 and 88 are shown and, for clarity, only spike 84 is shown with a lock attached. In the extended position, spikes 82, 84, 86, and 88 will firmly abut stops 40 even without assistance of the locks as long as the wheel moves in a counter-clockwise direction.

The traction device should be fabricated in both left and right side versions for installation on left and right wheels of the vehicle, respectively. The design for the right side application provides clockwise rotation of the disk 42 to extend the spikes, and counter-clockwise rotation to retract them, as shown in the drawing. Clockwise and counter-clockwise rotation, for the purposes of the description are the directions of rotation as seen when the vehicle is viewed from each side, separately, and applies, in each case, to the wheels on the same side as the viewer. The design for the left side application is just the opposite, i.e. counter-clockwise rotation of the disk extends the spikes and clockwise rotation retracts them. The effect of this design is that when the direction of rotation of the traction device provides forward motion to the vehicle, the force against the spikes will be in a direction consonant with maintenance of their extended position on both right and left side wheels. Thus, in the event of failure of the locks, the load will be resisted by the position stops and the spikes will be maintained in the extended position. The position stops 40 should be strong enough to carry the load transmitted by the spikes without help from the locks. The attaching slots 36 will be as shown in FIG. 1 for the right side wheel, however, the left side version of the slots 35 will be reversed so that they extend counter-clockwise from aperture 34. The effect of this design is to force the ring attaching bolts 34 into the slots 35 when the wheel rotation provides forward motion to the vehicle. Thus, if the bolts should loosen, the ring will be held in place on the attaching plate during forward motion of the vehicle on both left and right side wheels.

Collar 64 of the lock which was originally on spike 86 as shown in FIG. 1 when the spikes were retracted is shown as holding spike 84 when the spikes are in the extended position as shown in FIG. 3. Reaction collars 52, which are rotatably fixed to ring 28, are located near the pivoted end of the spikes. The spikes may also be held in any predetermined intermediate position through the use of intermediate locks 76 which may be placed in any of the apertures 90. Intermediate locks 76 are constructed exactly the same as the locks which are utilized to hold the spikes in the fully retracted and fully extended position, described above. The intermediate locks are optional and may be relocated in any of the apertures 90 depending upon the amount of extension desired. As shown in FIG. 3A, the locks which normally hold the spikes in the fully extended and fully retracted positions are temporarily stored by locking collar 64 on intermediate storage pin 80. Similarly, intermediate locks 76 are positioned on intermediate storage pin 80 when the spikes are locked in the fully extended position as shown in FIG. 3. In order to minimize the added load on the vehicle and the added rotation inertia on the wheels, the weight of the traction device should be kept as low as possible. The parts should be fabricated, so far as practical, with high strength, light weight materials. Care should be taken to exclude all mass of material not needed to provide necessary strength to the components. For example, the disk or attaching plate could have cutouts rather than being solid as shown in the drawing.

FIGS. 8, 9 and 10 represent another embodiment of the spike assembly which may be mounted on pins 44. This embodiment of the spike assembly is divided into two major subassemblies 92 and 94. Subassembly 94 is pivotably mounted about spindle 96 and has surface 116 which will abut surface 110 of piece 92 if piece 94 is rotated clockwise and surface 114 which will abut surface 118 of member 94 if it is rotated counter-clockwise. Subassembly 92 is connected to pins 44 at one end as previously discussed and has at its other end a portion 108 of reduced width with end surfaces 118 and 112 and slanted surface 110. Subassembly 94 has a portion 104 of reduced width with complementary end surfaces 114, 116 and slanted surface 106. A helical spring 102 surrounds spindle 96 with its two oppositely disposed ends being springingly engaged with surfaces 110 and 106. Spring member 102 will tend to force members 92 and 94 into the position shown in FIG. 10. The spike which is shown in the drawing will be mounted on the right wheel and hence will be rotating in a clockwise direction. This will cause a force to be exerted against surface 120 and hence the subassemblies 92 and 94 will normally be in the straight position as shown in FIG. 10. However, if the tooth 94 should engage a hard surface, member 94 will rotate about spindle 96 against the force of spring 102 until surface 116 engages surface 110 and surface 106 engages surface 112. This has several advantages such as facilitating a smoother ride, permitting the tip of member 94 to fold radially inward of the outer circumference of the tire or track of the vehicle, reducing wear on the spikes and minimizing breakage of parts by reducing the stress and strain on the respective parts. When the wheel turns enough so that tooth member 94 no longer engages the surface, spring member 102 will force member 94 to the straight position and keep it from pendulating.

Figure 11:
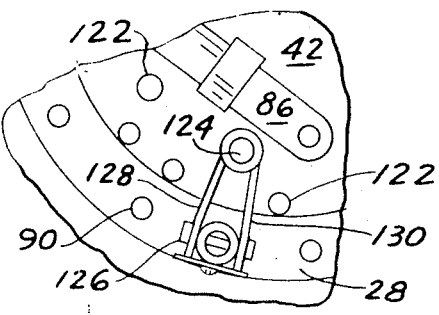
FIG. 11 is an elevational side view of another embodiment of the rotatable disk and the locking means.

Another embodiment of the rotatable disk 42 and the associated locking means is shown in FIG. 11. In this embodiment, the disk 42 is shown with passageways 122 which may be notches about the outermost periphery or apertures which are radially inward of the outer periphery. A plurality of locks 126 are pivotally mounted about ring 28 in apertures 90. Locks 126 may be identical to the previously mentioned locks with the exception of arms 128 and 130 and pin 124. Locks 126 have a pin 124 rigidly secured within sleeve 64 which extends into apertures 122 of disk 42. Arms 128 and 130 may be identical to or shorter than arms 60 and 62 so that pin 124 will align with passageways 122. The arms 128 and 130 are dimensioned to meet the spacing of passageways 122. In this embodiment, pins 54 may be eliminated from spike 86. This embodiment provides for greater flexibility and a larger number of positions in which the spikes may be locked. The specific number of apertures 90 and 122 may be chosen to meet specific needs. The apertures or notches 122 need not necessarily be at the outer periphery. The apertures 122 could be placed radially inward and a lock with longer arms 128 and 130 utilized. However, the radially inward location of apertures would make it more difficult to place pin 124 in apertures 122 when the spikes are in the retracted position. The passageways 122 may be located at random or predetermined radial positions.

In operation, the device would normally be stored in the vehicle. When its need is foreseen, it would be installed on studs 14, but not necessarily engaged. When the device has been attached to the wheel, the spikes are in a retracted position as shown in FIGURE 1. The locks positioned on pins 54 keep the disk 42 from rotating and thus the retracted position will be maintained. When additional traction or water propulsion is needed, the locks are disengaged from the spikes by lifting them from the pins 54 as shown in FIG. 7. The disk 42 is then rotated by applying torque, such as by a torque wrench, to the rotatable disk positioning nut 40. The spikes are thus rotated through an arc and pushed through the reaction collars 52 until stopped by the spike stops 40 with the spikes in the fully extended position as shown in FIG. 3. The spikes will then be in position to contact the soft or slippery terrain or water, with penetration of such terrain to varying depths below the surface. By reaching to locations of greater soil strength and providing a larger area of tractive surface the device will enable the vehicle to pull over or through the terrain or water.

Intermediate positions of spike extension can be obtained by the use of intermediate position locks 76 which will maintain the spikes in any predetermined position as shown in FIG. 3A. Intermediate locks 76 will engage the spikes after rotation of the disk through a smaller arc than that required for full extension of the spikes. If intermediate lock positions are used, the basic position locks are held out of the way by engagement with receiving pins 80. In operation, rotation of the extended spike imbedded in terrain or water will be resisted by a force component tangential to the arc of rotation of the assembly. This force will be transmitted by the spikes 82, 84, 86, and 88 through the reaction collars 52 and position locks to the attaching plate 10 and then to the wheel 18 and power train of the vehicle. The application of sufficient torque through the power train to the wheel will thus propel the vehicle through the terrain or water by transmission of forces through the traction device, against the resistance of the terrain or water.

When the additional traction or water propulsion is no longer needed, the locks are raised from the spike locking pins 54, a torque is applied to the disk positioning nut 40, and the disk is rotated in an opposite direction to that previously used to extend the spikes. This causes the spikes to be rotated through an arc and be withdrawn through the reaction collars to the retracted position as shown in FIG. 1. The basic position locks are then engaged on the spike locking pins 54 to hold the assembly in the retracted position. The fully retracted position is reached when the retraction stop 59 at the end of the spike is drawn into contact with the reaction collar 52 as shown in FIG. 4. When the transient need for the traction device has terminated, the device may either remain on the wheel in the retracted position or be removed and stored in the vehicle.

If preferred, the spikes could consist of only a short spike portion to which a complementary spike, which holds the spade, paddle, or other attachment device, would be attached. Another variation provides for the standard unadorned spike without the retraction stop 59. In this case, the retraction stop would be integral with the spade or accessory attachment.

It should be understood that there are other variations and designs which could be utilized to accomplish the invention within the concept as devised. In some circumstances, a much simpler variation will provide the additional tractive capability. If desired, the rotating feature of the disk can be eliminated and the spikes mounted in a permanently radial direction. The spikes could be installed to slide in radial slots or guides from the retracted to the extended position by means of centrifugal force generated by the wheel rotation. When not in use, the spikes could be held in the retracted position by springs and locked in this position by locks.

It should be further understood that the disk could be rotated by means other than applying torque to the positioning nut. For example, in place or in addition to the disk positioning nut, there could be two or more circumferentially equidistant holes in the disk. Torque could then be applied to rotate the disk by placing an appropriate tool in the holes and twisting the tool. Although the device is shown as consisting of four spikes, it should be understood that any number may be used without departing from the scope of the invention.

It should be still further understood that the traction device could be activated by remote control from inside the vehicle. This could be accomplished by use of a hydraulic, pneumatic, hydro-pneumatic, and/or electric servo system mounted on the vehicle and attached to the disk through a rotary valve or other mechanism. The remote control system could be used to control the amount of rotation of the disk and hence lock the spike in any desired position, thereby eliminating the necessity of the mechanical lock.

It will be apparent that many minor modifications and variations will be apparent to those of ordinary skill in the art and by applying current knowledge readily adopt it for various applications without omitting essential features of the invention. Accordingly, it is intended that such modifications and variations are to be comprehended within the meaning and range of equivalence described hereinafter.

What I claim is:

1. A traction device which is adaptable for mounting on a land vehicle for increasing the terrain capability of said vehicle comprising:
    a substantially flat attachment plate which is adapted for mounting on said wheel having radially inner and outer circumferentially disposed axially projecting spacer means,
    an outer ring axially displaced from said attachment plate and mounted on said outer spacer means,
    a disk axially displaced from said attachment plate and mounted rotatably on said inner spacer, portions on said outer ring overlapping said disk,
    a plurality of propelling spikes pivotally mounted at one end on said rotatable disk and extending through reaction collars which are mounted on said outer ring, and
    at least one locking device rotatably mounted on said outer ring which to selectively secure said propelling spikes in radially adjusted positions.

2. The device according to claim 1 wherein said rotatable disk has a plurality of passageways about the outer periphery which are adapted to receive said locking device.

3. The device according to claim 1 wherein said inner and outer spacer means comprises flanges which are integrally formed with said attaching plate.

4. The device according to claim 1 wherein a positioning nut is fastened to the center of said rotatable disk to facilitate rotation of said disk.

5. The device according to claim 1 wherein said propelling parts are spikes having pin means extending therefrom which are adapted to receive said locking device.

6. The device according to claim 1 wherein each of said spikes comprises a first and second subassembly, said second subassembly being rotatably mounted about one end of said first subassembly.

7. The device according to claim 6 wherein spring means engages said first and second subassemblies to hold said second subassembly in alignment with said first subassembly.

8. The device according to claim 6 wherein a first end of said first subassembly is rotatably mounted about a pin which is secured to said rotatable disk, a second end of said first subassembly has pin means extending therefrom, said second subassembly having a first end pivotably mounted about said pin means of said first subassembly, and a helical spring located around said spindle and engaging said first and second subassemblies.

9. The device according to claim 1 wherein:
    said propelling parts are spikes which are extendable through said retraction collar from a position of full retraction to a position of full extension, and
    said outer ring has a plurality of position stops mounted about its inner periphery which abut said spikes in the extended positions.

10. The device according to claim 9 wherein said spikes have a retraction stop attached to their free ends.

11. The device according to claim 10 wherein an accessory spade is attached to said retraction stop and being effective to increase the traction of said device.

12. The device according to claim 1 wherein said locking device comprises:
    first and second collars in spaced relation, and
    first and second connecting members which are attached to said first collar and pivotably mounted about said second collar.

13. The device according to claim 12 wherein said first collar of said locking device is secured to said pin means of a first one of said spikes when said spikes are in the fully retracted position and secured to said pin means of a second one of said spikes when said spikes are in the fully extended position.

14. The device according to claim 12 wherein said first collar of said locking device is secured to said pin means when said spikes are in a position intermediate full retraction and full extension.

15. The device according to claim 12 wherein said second collar is secured to pin means which is rotatably mounted in said outer ring.

16. The device according to claim 12 wherein said spring means are mounted on said second collar in forcible engagement with said first and second connecting members.

17. The device according to claim 16 wherein said spring means is a flat spring.

18. The device according to claim 1 wherein a plurality of locking devices are rotatably mounted in said outer ring.

19. The device according to claim 18 wherein each of said locking devices comprises:
    first and second collars in spaced relation, and
    first and second connecting members which are attached to said first collars, and pivotably mounted about said second collar.

20. The device according to claim 19 wherein:
    said first collars of a first portion of said locking devices are secured to said pins when said spikes are located in either the fully extended or fully retracted position, and
    said first collars of a second portion of said locking devices are secured to said pins when said spikes are located in a position intermediate the fully extended and fully retracted positions.

21. A traction increasing device for improving the terrain capability of a land vehicle which is adaptable for mounting on said vehicle comprising:
    an attaching plate,
    an outer ring,
    a rotatable disk,
    propelling devices which are projectable from any predetermined position of full retraction to full extension locking devices,
    said attaching plate having inner and outer flange means disposed about its outer circumference,
        said outer flange means supporting said outer ring,
    said outer ring being axially displaced from said attaching plate and having an inner and outer circumference,
    said rotatable disk being disposed within said inner circumference of said outer ring and supported by said inner flange,
        a disk positioning nut located at the center of said disk,
        spike anchoring pins disposed about said disk and adapted to secure said propelling devices,
    said propelling devices comprising:
        a plurality of spikes having one end pivotally mounted on said spike anchoring pins, and
        a second end extending through a reaction collar which is rotatably mounted in said outer ring,
    said locking devices having:
        first and second collars, first and second connecting members attached to said first collar and rotatable about said second collar, a first portion of said locking devices being adapted to lock said spikes in the fully extended or fully retracted position and a second portion of said locking devices being adapted to lock the spikes in any predetermined intermediate positions.

References Cited

UNITED STATES PATENTS

| | | | |
|---|---|---|---|
| 1,849,004 | 3/1932 | Glapion | 301—47 |
| 2,540,147 | 2/1951 | Sutherland | 301—47 |
| 2,818,301 | 12/1957 | Hayden | 301—46 |
| 2,899,241 | 8/1959 | Colin | 301—47 |

RICHARD J. JOHNSON, Primary Examiner